US008458438B2

(12) United States Patent
Heller et al.

(10) Patent No.: US 8,458,438 B2
(45) Date of Patent: Jun. 4, 2013

(54) SYSTEM, METHOD AND COMPUTER PROGRAM PRODUCT FOR PROVIDING QUIESCE FILTERING FOR SHARED MEMORY

(75) Inventors: Lisa C. Heller, Rhinebeck, NY (US); Ute Gaertner, Schoenaich (DE); Dan F. Greiner, San Jose, CA (US); Damian L. Osisek, Vestal, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/037,897

(22) Filed: Feb. 26, 2008

(65) Prior Publication Data

US 2009/0216995 A1    Aug. 27, 2009

(51) Int. Cl.
*G06F 12/00* (2006.01)
*G06F 13/00* (2006.01)
*G06F 13/28* (2006.01)

(52) U.S. Cl.
USPC .................................. 711/207; 711/E12.061

(58) Field of Classification Search
USPC .......................................... 711/207, E12.061
See application file for complete search history.

(56) References Cited

U.S. PATENT DOCUMENTS

| | | | |
|---|---|---|---|
| 4,792,895 A | 12/1988 | Tallman | |
| 4,843,541 A | 6/1989 | Bean et al. | |
| 5,222,215 A | 6/1993 | Chou et al. | |
| 5,317,705 A | 5/1994 | Gannon et al. | |
| 5,381,535 A | 1/1995 | Gum et al. | |
| 5,428,757 A * | 6/1995 | Sutton | 718/107 |
| 5,530,820 A | 6/1996 | Onodera | |
| 5,555,414 A | 9/1996 | Hough et al. | |
| 5,574,878 A | 11/1996 | Onodera et al. | |
| 5,574,936 A | 11/1996 | Ryba et al. | |
| 5,584,042 A | 12/1996 | Cormier et al. | |
| 5,652,853 A | 7/1997 | Duvalsaint et al. | |
| 6,119,219 A | 9/2000 | Webb et al. | |
| 6,378,027 B1 | 4/2002 | Bealkowski et al. | |
| 6,453,392 B1 | 9/2002 | Flynn, Jr. | |
| 6,493,741 B1 | 12/2002 | Emer et al. | |
| 6,493,816 B1 | 12/2002 | Munroe et al. | |
| 6,604,185 B1 * | 8/2003 | Fromm | 711/207 |
| 6,671,795 B1 | 12/2003 | Marr et al. | |
| 6,728,746 B1 | 4/2004 | Murase et al. | |
| 6,959,352 B1 | 10/2005 | Dickey | |

(Continued)

OTHER PUBLICATIONS

"IBM® z/Architecture Principles of Operation", Publication No. SA22-7832-05, 6th Edition, Apr. 2007. 1,215 pages separated into 4 electronic attachments.

(Continued)

*Primary Examiner* — Sheng-Jen Tsai
(74) *Attorney, Agent, or Firm* — Cantor Colburn LLP; John Campbell

(57) ABSTRACT

A system, method and computer program product for providing quiesce filtering for shared memory. The method includes receiving a shared-memory quiesce request at a processor. The request includes a donor zone. The processor includes translation look aside buffer one (TLB1). It is determined that the shared-memory request can be filtered by the processor if there not any shared memory entries in the TLB1 and the donor zone is not equal to a current zone of the processor and the processor is not running in host mode. The shared-memory quiesce request is filtered in response to the determining.

20 Claims, 7 Drawing Sheets

U.S. PATENT DOCUMENTS

| | | | |
|---|---|---|---|
| 7,167,956 B1 | 1/2007 | Wright et al. | |
| 7,234,037 B2 | 6/2007 | Errickson et al. | |
| 7,275,181 B2 * | 9/2007 | Staiger | 714/13 |
| 7,321,369 B2 | 1/2008 | Wyatt et al. | |
| 7,530,067 B2 * | 5/2009 | Slegel et al. | 718/100 |
| 8,140,834 B2 * | 3/2012 | Heller et al. | 712/244 |
| 2002/0052914 A1 | 5/2002 | Zalewski et al. | |
| 2002/0083258 A1 | 6/2002 | Bauman et al. | |
| 2003/0037089 A1 | 2/2003 | Cota-Robles et al. | |
| 2003/0037178 A1 | 2/2003 | Vessey et al. | |
| 2004/0143712 A1 | 7/2004 | Armstrong et al. | |
| 2004/0230976 A1 * | 11/2004 | Slegel et al. | 718/100 |
| 2005/0102670 A1 | 5/2005 | Bretl et al. | |
| 2005/0114855 A1 | 5/2005 | Baumberger | |
| 2005/0223005 A1 | 10/2005 | Shultz et al. | |
| 2006/0036824 A1 | 2/2006 | Greiner et al. | |
| 2006/0259710 A1 | 11/2006 | Gimpl et al. | |
| 2006/0259818 A1 | 11/2006 | Howell et al. | |
| 2007/0050764 A1 | 3/2007 | Traut | |
| 2007/0067775 A1 | 3/2007 | Shultz et al. | |
| 2007/0089111 A1 | 4/2007 | Robinson et al. | |
| 2007/0113217 A1 | 5/2007 | Gish et al. | |
| 2007/0157198 A1 | 7/2007 | Bennet et al. | |
| 2008/0046885 A1 | 2/2008 | Shultz et al. | |
| 2008/0086729 A1 | 4/2008 | Kondoh et al. | |
| 2009/0216929 A1 | 8/2009 | Heller | |
| 2009/0216963 A1 | 8/2009 | Greiner et al. | |
| 2009/0217264 A1 * | 8/2009 | Heller et al. | 718/1 |
| 2009/0217269 A1 * | 8/2009 | Heller et al. | 718/100 |

OTHER PUBLICATIONS

U.S. Appl. No. 12/037,887 Non Final Office Action dated Jun. 14, 2010.
U.S. Appl. No. 12/037,808 Final Office Action Sep. 28, 2010.
U.S. Appl. No. 12/037,808 Non Final Office Action dated Apr. 27, 2010.
U.S. Appl. No. 12/037,177; Non Final Office Action dated Apr. 26, 2011.
U.S. Appl. No. 12/037,887 Final Office Action dated Dec. 9, 2010.
U.S. Appl. No. 12/037,808 Non Final Office Action dated Feb. 17, 2011.
U.S. Appl. No. 12/037,177; Final Office Action dated Jul. 12, 2012, 18 pages.
U.S. Appl. No. 12/037,808 Notice of Allowance dated Nov. 16, 2011.
U.S. Appl. No. 12/037,177; Final Office Action dated Sep. 14, 2011.
U.S. Appl. No. 12/037,177 Non Final Office Action dated Feb. 9, 2012.
U.S. Appl. No. 13/372,603 Notice of Allowance dated Jul. 31, 2012, 14 pages.
U.S. Appl. No. 12/037,887 Notice of Allowance dated Oct. 10, 2012, 23 pages.

* cited by examiner

SYSTEM, METHOD AND COMPUTER PROGRAM PRODUCT FOR PROVIDING QUIESCE FILTERING FOR SHARED MEMORY

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates generally to processing within a computing environment, and more particularly, to filtering requests by one or more processors of the computing environment.

The processing of a request by one processor of a computing environment may affect one or more other processors of the environment. For example, in a Symmetric Multiprocessing System (SMP) based on the IBM z/Architecture, there are certain broadcast purge operations such as Set Storage Key (SSKE), Invalidate Page Table Entry (IPTE), Invalidate DAT Table Entry (IDTE) and Compare and Swap and Purge (CSP and CSPG) which require all the processors in the system to quiesce in order to observe the system update(s) consistently. Other computer architectures also provide a similar mechanism.

One common implementation for the quiesce purge operation includes the following: 1) all the processors are quiesced (i.e., most normal processing operations are suspended, including accessing the TLB and ALB); 2) any buffered entries in the Translation Look-aside Buffers (TLBs) and/or in the Access-Register-Translation Look-aside Buffer (ALB) which are dependent on the resources being updated are invalidated; 3) the common resource (translation table entry in storage for IPTE, IDTE, CSP or CSPG or a storage key for SSKE) is updated, and 4) finally, the quiesce is released and the processors continue their normal activity. Obviously, this implementation could have a major performance impact, especially for large SMP configurations, since all processors must be quiesced for the duration of the operation. In particular, it is common that one processor is executing a long running instruction that is not interruptible, so that the one processor can not reach the quiesced state for some time. Thus, all other processors are required to wait for this last processor to reach the quiesced state before the steps described above can be completed.

Some strides have been made in the above processing to enhance performance by attempting to quiesce the processors for a shorter period of time. For example, in some implementations when a processor receives a request, it immediately quiesces and then purges the appropriate entries in its own TLB and/or ALB. After the purge is complete, this processor is allowed to continue processing subject to various restrictions. One of these restrictions includes that the processor is not permitted to perform address translation or fetch a storage key but instead must stall until the quiesce is released. Only after the quiesce is released, indicating that the system resources have been updated, are all restrictions removed from the processors.

Further strides to enhance performance are directed to reducing the restriction applied to address translation and key accesses during the quiesce window. For example, after purging its own TLB and/or ALB the purging processor is only restricted, using the page index (PX), segment index (SX) and/or absolute address of the translation, to perform an address translation or key access which potentially uses the system resources being updated by the quiesce operation.

Other performance enhancements have been directed to reducing the number of processors which need to honor the quiesce request. Since 1) the interruption of processors to honor the quiesce request is needed to prevent inconsistent values for translation tables or storage keys from being observed in the middle of an instruction or function and 2) when the active zone on the receiving processor is different from the zone which initiated the quiesce operation, the storage accesses being made by the receiving processor do not use the system resources that are being updated by the initiating zone, there is no need for processors running in a zone different than the quiesce-initiator's zone to be interrupted. This decreases the number of processors that need to be interrupted for a particular quiesce request and, in turn, also decreases the overall time needed to handle the quiesce request since the initiator needs to wait for fewer processors to respond to the interruption request.

Thus, although attempts have been made to reduce the amount of time that processors are quiesced for system resource updates, enhancements are still needed. With the addition of the shared-memory translation facility, enhancements are needed to prevent zones which are updating system resources in shared memory from adversely affecting the performance of partitions which are not using shared memory.

BRIEF SUMMARY OF THE INVENTION

An exemplary embodiment includes a method for filtering quiesce interruption requests at a processor. The method includes receiving a shared-memory quiesce request at the processor. The request includes a donor zone. The processor includes translation look aside buffer one (TLB1). It is determined that the shared-memory request can be filtered by the processor if there not any shared memory entries in the TLB1 and the donor zone is not equal to a current zone of the processor and the processor is not running in host mode. The shared-memory quiesce request is filtered in response to the determining.

Another exemplary embodiment includes a system for filtering quiesce interruption requests at a processor. The system includes a TLB1 and logic for executing a method. The method includes receiving a shared-memory quiesce request at the processor, the request including a donor zone. It is determined that the shared-memory quiesce request can be filtered by the processor if there not any shared memory entries in the TLB1 and the donor zone is not equal to a current zone of the processor and the processor is not running in host mode. The shared-memory quiesce request is filtered in response to determining that the shared-memory quiesce request can be filtered.

A further exemplary embodiment includes a computer program product for filtering quiesce interruption requests at a processor. The computer program product includes a tangible storage medium readable by a processing circuit and storing instructions for execution by the processing circuit for performing a method. The method includes receiving a shared-memory quiesce request at the processor. The request includes a donor zone. The processor includes translation look aside buffer one (TLB1). It is determined that the shared-memory request can be filtered by the processor if there not any shared memory entries in the TLB1 and the donor zone is not equal to a current zone of the processor and the processor is not running in host mode. The shared-memory quiesce request is filtered in response to the determining.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention prevents zones which are updating system resources in shared memory from adversely affecting the performance of partitions which are not using shared memory. An exemplary embodiment minimizes the effect of shared memory purges on other partitions by using a switch to indicate if there are any shared memory entries in the TLB1. In addition, SSKE instructions are tagged with the donor zone, even though the instruction may not be sourced from the donor zone, in order to quickly identify whether a purge request to the partition can be filtered.

Figure 1:
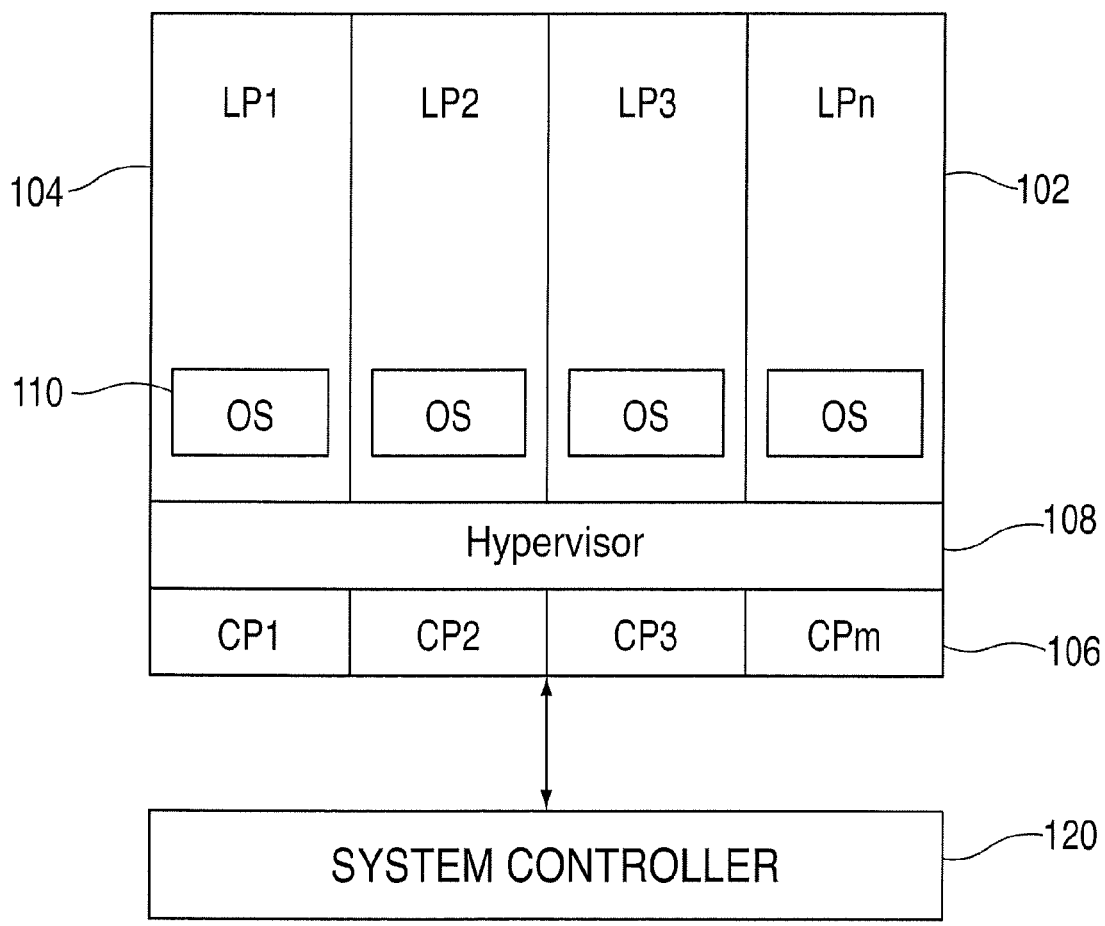
FIG. 1 depicts one embodiment of a computing environment that may be implemented by an exemplary embodiment of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. In one example, a computing environment based on the z/Architecture includes an eServer zSeries, offered by International Business Machines Corporation, Armonk, N.Y.

As one example, computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104 to operate on a single or multiple physical processors in a time sliced manner. In this particular example, each logical partition 104 has a resident operating system 110, which may differ for one or more logical partitions 104. In one embodiment, operating system 110 is the z/OS operating system, offered by International Business Machines Corporation, Armonk, N.Y.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106. One example of hypervisor 108 is the Processor Resource/Systems Manager (PR/SM), offered by International Business Machines Corporation, Armonk, N.Y.

System controller 120, which is coupled to the central processor complex, includes centralized logic responsible for arbitrating between different processors issuing requests. For instance, when system controller 120 receives a quiesce request, it determines that the requester is the initiating processor for that request and that the other processors are receiving processors; it broadcasts messages; and otherwise, handles requests. Further details are described with reference to FIG. 2.

Figure 2:
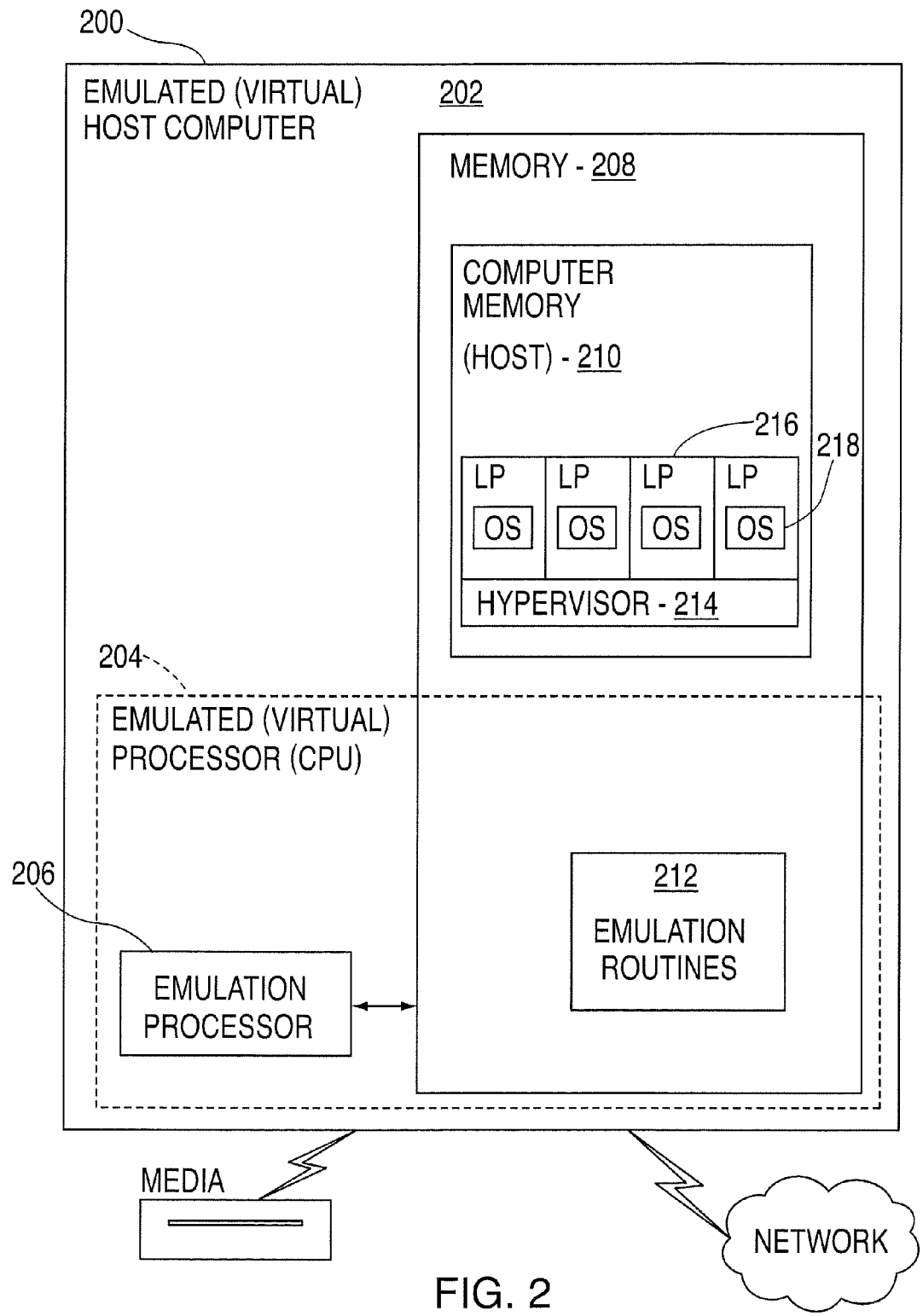
FIG. 2 depicts one embodiment of an emulated computing environment that may be implemented by an exemplary embodiment of the present invention.

Another example of a computing environment to incorporate one or more aspects of the present invention is depicted in FIG. 2. In this example, an emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more logical partitions (LPs) 216 running operating systems 218, analogous to the like-named elements in FIG. 1. Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the hypervisor seeks to execute a program in a logical partition. The emulation routines 212 may include support for this instruction, and for executing a sequence of instructions of that logical partition in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

Figure 3:
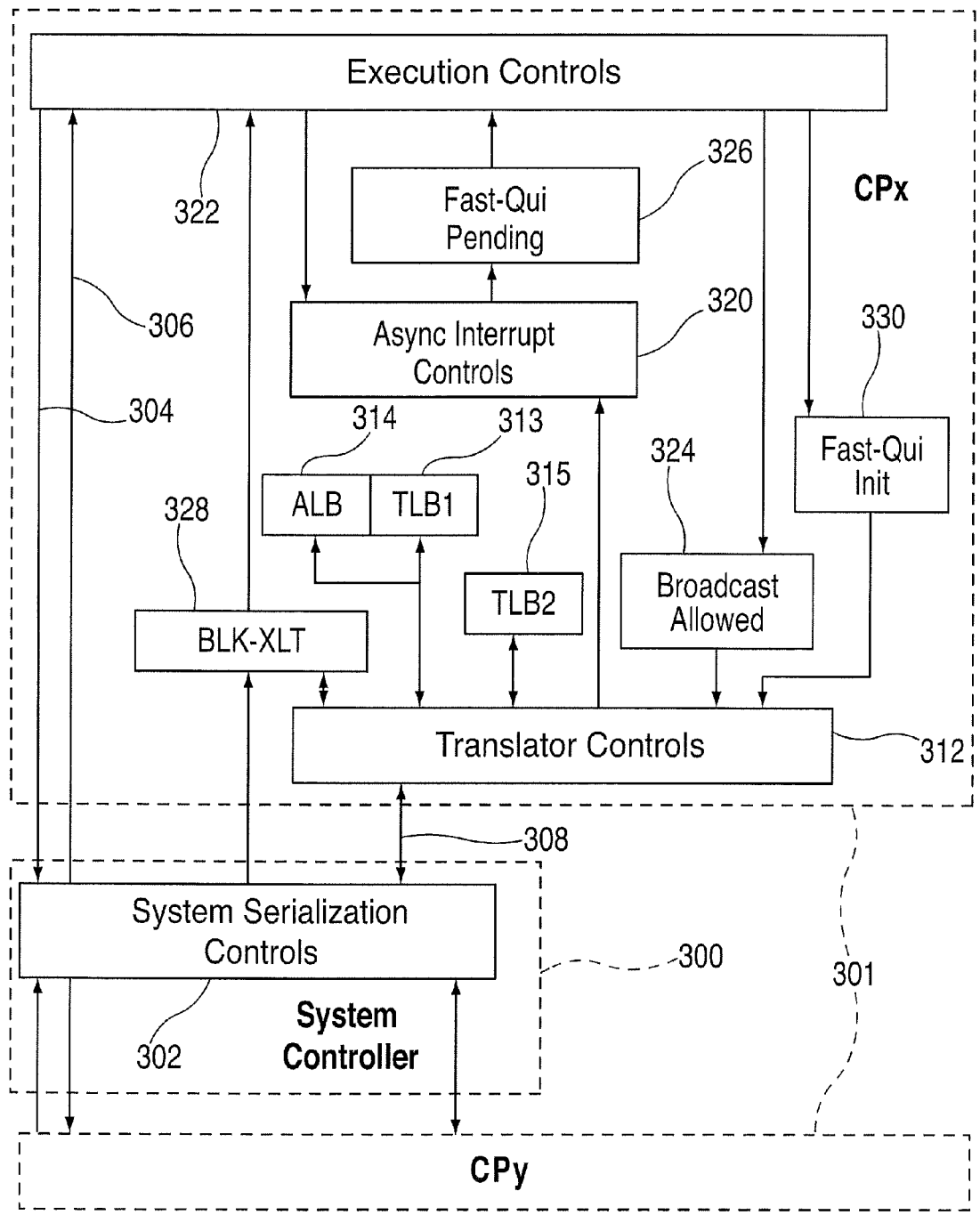
FIG. 3 depicts one embodiment of further details associated with a controller of FIG. 1, in accordance with an aspect of the present invention.

FIG. 3 depicts one example of a system controller 300 coupled to a plurality of central processors (CPUs) 301. In this example, two central processors are depicted. However, it will be understood that more than two processors may be coupled to system controller 300.

System Controller 300 includes various controls including, for instance, system serialization controls 302. The system serialization controls 302 are used to insure that operations that are to be serialized, such as Invalidate Page Table Entry (IPTE), Invalidate DAT Table Entry (IDTE), Set Storage Key Extended (SSKE), or Compare and Swap and Purge (CSP and CSPG) instructions, are serialized, such that only one such instruction is in progress at one time in the computing environment. It also monitors the sequence of events for that operation.

System controller 300 is coupled to each central processor 301 via various interfaces. For instance, an interface 304 to the controller 300 is used by the Licensed Internal Code in a central processor to send "control" commands, which specify an action to be taken, and to send "sense" commands, which return information from the controller 300. Another interface is a response bus 306, which is used to return information from the controller 300 for the "sense" commands. The response bus 306 is also used to communicate command status for "control" commands, and may be set from a plurality of sources within the controller 300, including the system serialization controls 302. A central processor 301 can use this interface to sense the state of the system serialization controls 302 in system controller 300.

A further interface is interface 308, which provides commands to translator controls 312 of central processor 301. Translator controls 312 process commands, in response to the signals. In one example, translator controls 312 process commands that affect one or more buffers, such as Translation Look-aside Buffers (TLBs) 313 and 315 and Access-Register-Translation Look-aside Buffers (ALBs) 314, described in further detail below.

In addition to translator controls 312, central processor 301 includes various other controls, including, for instance, asynchronous interruption controls 320 and execution controls 322. When the translator controls 312 receive a quiesce purge request from the controller 302, the translator controls 312 determine whether the request requires an interruption to this processor 301 and if it does, it sends a signal to the asynchronous interruption controls 320. In response to this, asynchronous interrupt controls 320 cause an internal fast-quiesce interruption 326 to be pending in the receiving processor, which in turn, causes execution controls 322 to suspend program instruction processing, at the next interruptible point. In response to the suspension, execution controls 322 invoke a millicode routine to set a broadcast operation allowed latch 324 to enable translator controls 312 to process the pending request. This causes the block-translation (BLK-XLT) latch 328 to be set on all processors 301 besides the fast-quiesce initiator, indicated by latch 330, until the system controller 300 receives the reset fast-quiesce command from the quiesce initiator. The block-translation latch 328 indicates to the translator controls 312 that certain translations (which may be associated with the pending system update) should be held until this latch 328 has dropped.

The above described computing environment is only one example. Many variations are possible without departing from the spirit of the present invention. For example, one or more partitions can be running in different architecture modes. Further, as another example, the environment need not be based on the z/Architecture, but instead, can be based on other architectures offered by Intel, Sun Microsystems, as well as others.

When PR/SM dispatches a guest (or virtual CPU within a zone) it does this by issuing the Start Interpretive Execution (SIE) instruction. The operand of SIE is a control block, called the state description (SD), which defines the state of that particular guest. Therefore, the state description address can be used as a unique identifier for each virtual CPU within and between the zones.

When the processor is executing instructions for a program running in a zone or partition, it is said to be running in a guest and the zone that is currently executing is called the "active" zone. When the processor is executing instructions on behalf of the PR/SM hypervisor, it is said to be running in the host. Logically, each processor has a smaller TLB1 and a larger TLB2. Millicode guarantees that at any given time the TLB1 and ALB contain entries for only a single zone (or guest). It does this by purging the TLB1s and ALB on entry into the guest, if needed. The TLB2, on the other hand, may contain entries for multiple zones at a time—each being tagged with a zone number and an ID based on the state description to differentiate them.

In the state description, the hypervisor specifies a relocation zone number (RZone) associated with that partition or zone. All virtual CPUs within a given zone will have the same non-zero RZone value specified. Therefore, the RZone associated with the guest code that is currently running on any particular physical processor can be used to identify the processors that may be using resources associated with that zone. During entry into any guest, millicode takes the RZone value from the control block and loads it into a hardware register call the Active Zone Number (AZN). The hardware uses the AZN in a number of ways. It is used for tagging entries made in the TLB2 and, therefore, to ensure correct tagging of the TLB2 entries, the AZN must be zero when running in host mode. As already described, in prior art, the hardware also uses the AZN to determine which quiesce purge requests should be filtered by the processor.

The interruption of processors to honor the quiesce request is needed to prevent inconsistent values for translation tables or storage keys from being observed in the middle of an instruction or function. Originally, the quiesce interruption was honored by all processors in the system. In actuality, when the active zone on the receiving processor is different from the zone that initiated the quiesce operation, the storage accesses being made by the receiving processor do not use the system resources that are being updated by the initiating zone. As a result, there is no need for processors running in a zone different than the quiesce-initiator's zone to be interrupted. This is referred to as "zone filtering" and it is accomplished by tagging each quiesce request with a zone number equal to the active zone of the initiator.

Since the TLB1 contains entries for the current zone only, it does not hold any entries relevant to an IPTE, IDTE, CSP or CSPG request from a different zone and, therefore, it does not need to process the invalidation and associated quiesce interruption at all. In the case of an SSKE initiated by a different zone, there may be host entries in the local TLB1 which contain the old key value. The invalidation of these entries, however, can be delayed, as long as it is done before executing any host instructions. Even when running in a different zone than the quiesce initiator, the TLB2 may have entries relevant to the quiesce request, although they are not currently being used. The TLB2 must invalidate the appropriate entries, although when the requesting zone is different from the initiator it may be done in the background, using the provided zone number and other relevant information. This decreases the number of processors that need to be interrupted for a particular quiesce request and, in turn, also decreases the overall time needed to handle the quiesce request since fewer processors are required to respond to the interruption request.

Figure 4:
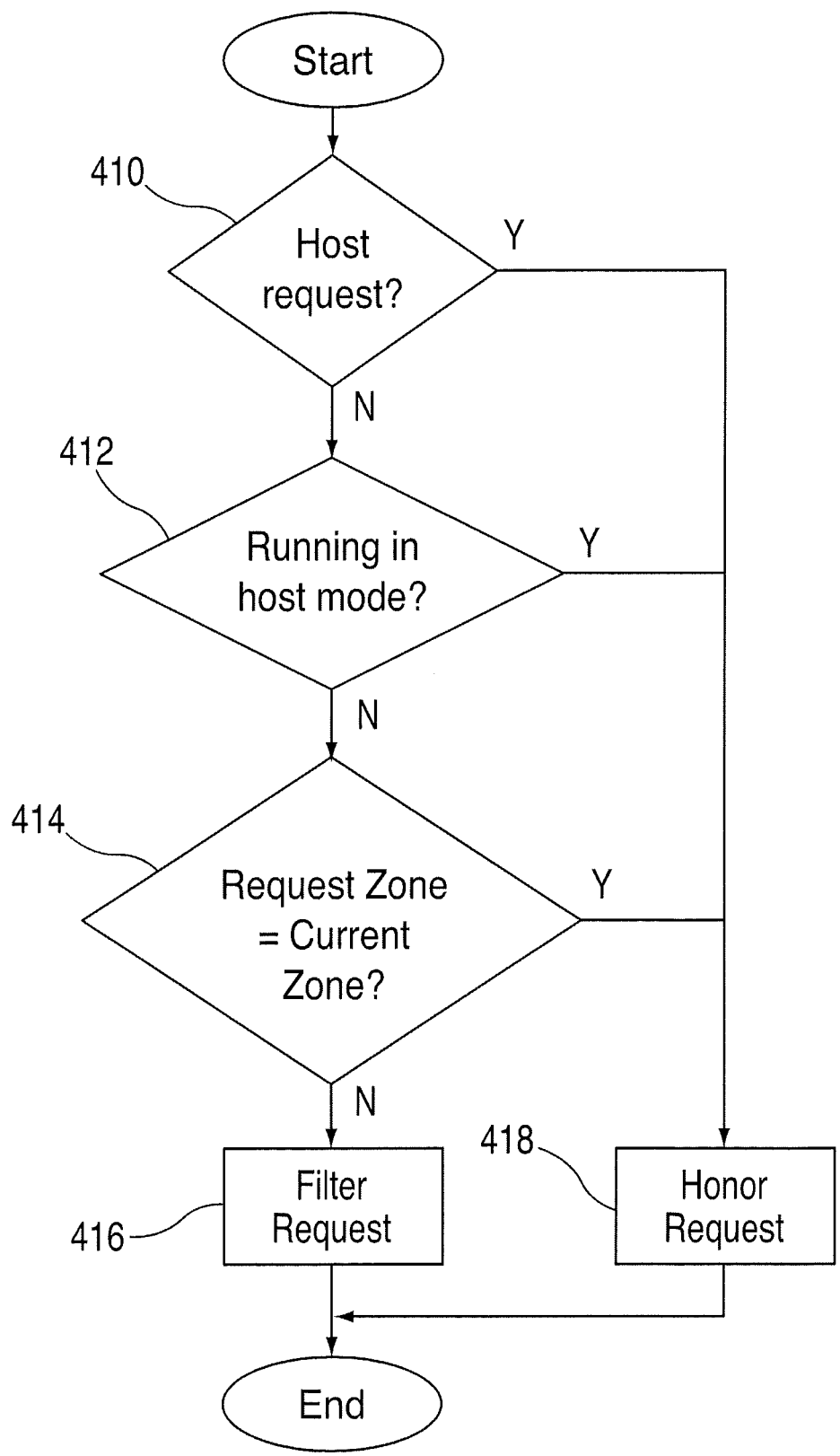
FIG. 4 depicts one embodiment of an algorithm to filter incoming quiesce interruption requests, in accordance with an aspect of the present invention.

FIG. 4 illustrates the algorithm used by the translator to determine if any particular quiesce interruption request can filtered. If 1) the incoming quiesce request is a host request 410, 2) the receiving processor is currently running in host mode 412 or 3) the active zone of the receiving processor matches the active zone of the quiesce initiator 414 then the translator must honor (i.e. can not filter) the quiesce interruption request 418. Otherwise, the processor may filter the request 416.

Figure 5:
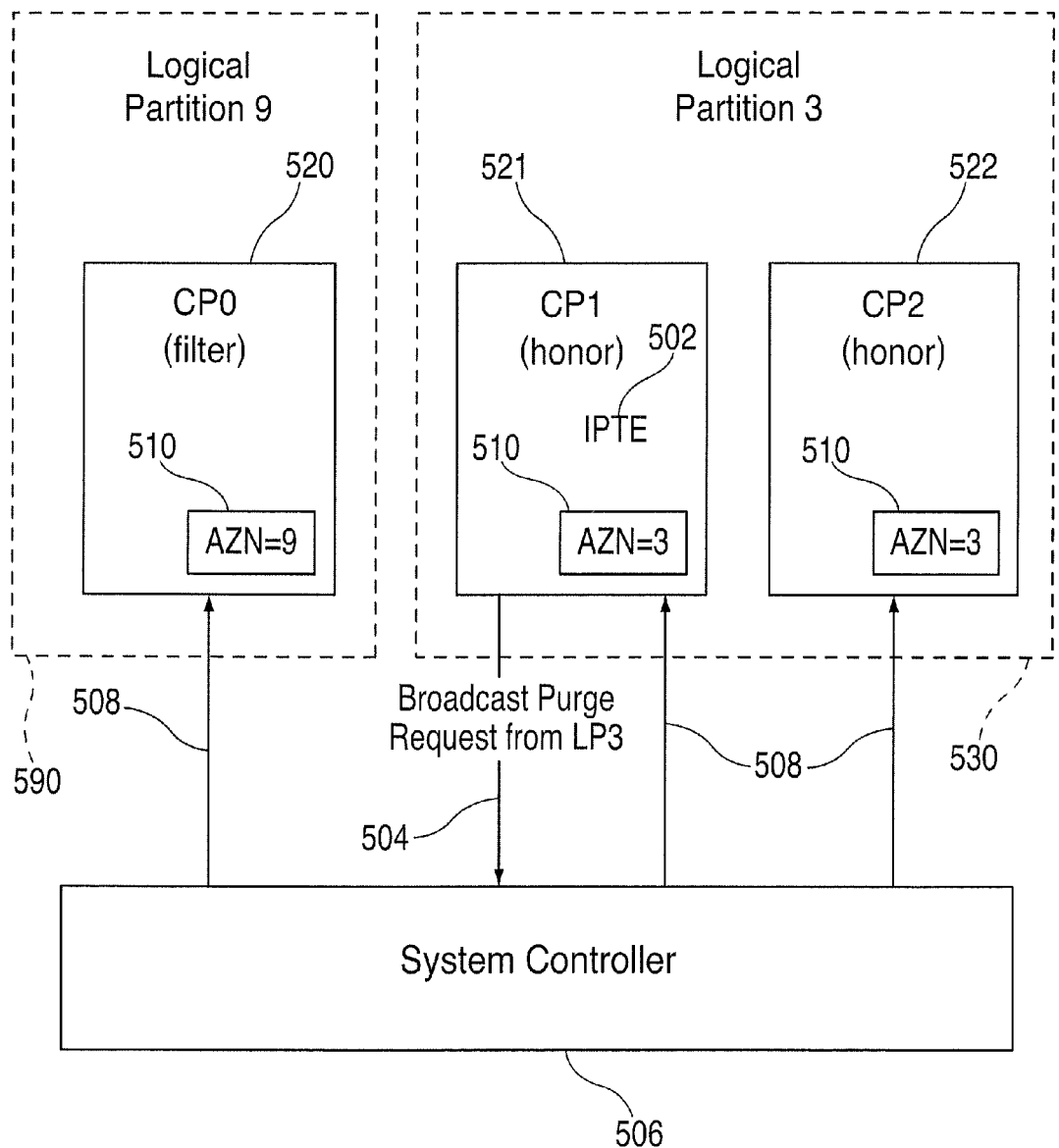
FIG. 5 depicts one embodiment of the flow associated with controlling a system resource update across a computing environment, in accordance with an aspect of the present invention.

In the example illustrated in FIG. 5, there are two logical partitions currently running in the computer environment— Logical Partition 9 (LP9) 590 and Logical Partition 3 (LP3) 530. On each physical processor there is a register which holds the Active Zone Number (AZN) 510 that corresponds to the partition that is currently running on that processor. CP1, currently running LP3, executes a quiesce operation (IPTE in this case) 502. That IPTE millicode sends a quiesce request 504, tagged with LP3, to the system controller (SC) 506. The SC then forwards this request, still tagged with LP3, to all the processors in the system 508. In this case, CP0 520 is running a different partition (LP9 590) so the request can be filtered; CP1 521, the quiesce initiator, and CP2 522 are both running in LP3 530 as indicated by the AZN and, therefore, must honor the quiesce interruption request.

The Shared-Memory-Translation facility provides a means for hardware to access, given appropriate authority, storage which may be shared among multiple zones. The translation mechanism which determines if the access resides in shared memory and, if so, maps it appropriately, is performed in the final step of address translation, that is after guest dynamic address translation (DAT) is complete. Since each zone has its own guest DAT tables to translate guest virtual address and architecturally these translation tables can not reside in shared memory, any quiesce request that is associated with DAT table updates (i.e. IPTE, IDTE, CSP or CSPG) performed by one zone is still relevant to only that zone. As a result, no special filtering is required for shared memory in these cases. SSKEs, however, may apply to shared-memory entries in the TLBs of multiple zones. The mechanism for handling this is described in more detail below. In addition, a new Purge Shared Memory Entries command is provided to PR/SM for use when the shared-memory translation tables in storage are invalidated.

There are two models for exploiting the shared-memory-translation facility. The first allows zones to access shared memory which resides within PR/SM storage. This is referred to as the "non-donor" model. In this case, the only way to access the storage is using the shared-memory address. The other model allows a zone to donate its storage for use as shared memory among partitions. This is referred to as the "donor" model and the shared memory object has a "donor zone" associated with it that is equal to the relocation zone (RZone) of the partition which donated its storage. In this case, the storage may be referenced by the shared-memory address or, in the donor zone, by the non-shared address.

The invention adds the ability to filter shared-memory quiesce requests on receiving processors. This allows for partitions which are not using shared-memory to filter shared-memory quiesce requests from other zones. This is managed by adding a new latch in the translator of each processor. This latch indicates that shared-memory entries may exist in the TLBs. This latch is set when the translator sends a shared-memory translation to the TLB and is reset when a purge of the associated TLB is done. When receiving a shared-memory quiesce request, the translator uses this latch to determine if the request can be filtered as described below.

In addition to the latch associated with the TLB1, which is used to determine if the quiesce interruption can be filtered, a similar latch is added to the TLB2. This latch is used by the translator to determine if the purge TLB command should be forwarded to the TLB2. If the TLB2 may contain shared-memory entries then a scrub can be done to invalidate those entries. If no shared-memory entries exist in the TLB2, as indicated by the latch, then this scrub action can be avoided, thus saving the time required to perform it.

In the case of a shared-memory SSKE, since the invalidation is based on an absolute address, it is possible that the receiving processor needs to invalidate both shared-memory entries and non-shared-memory entries from the TLB. The non-shared entries can only be made by the donor zone, since that is the only zone that can access the data using the non-shared address. To make sure all the appropriate entries are cleared, the initiating processor issues a shared-memory SSKE tagged with the donor zone (as opposed to the active zone of the initiator). The receiving processors will then honor (not filter) these shared-memory SSKEs if 1) the active zone matches the donor zone, 2) if the TLB1 may contain shared-memory entries or 3) if the processor is running in host mode. As is done for all filtered SSKE requests, when the processor leaves a partition, we wait for any filtered quiesce requests to complete and if any filtered SSKE requests occurred while executing in that partition then all host entries are purged from the TLB1.

In support of the shared-memory translation facility, a command was provided that gives PR/SM the ability to purge all shared-memory entries from the TLBs. This would be used when the Shared Memory translation tables or associated values are updated, potentially causing some of the TLB entries to be invalid. The receiving processor can filter this command if the latch indicates that no shared-memory entries exist in the TLB1.

Figure 6A:
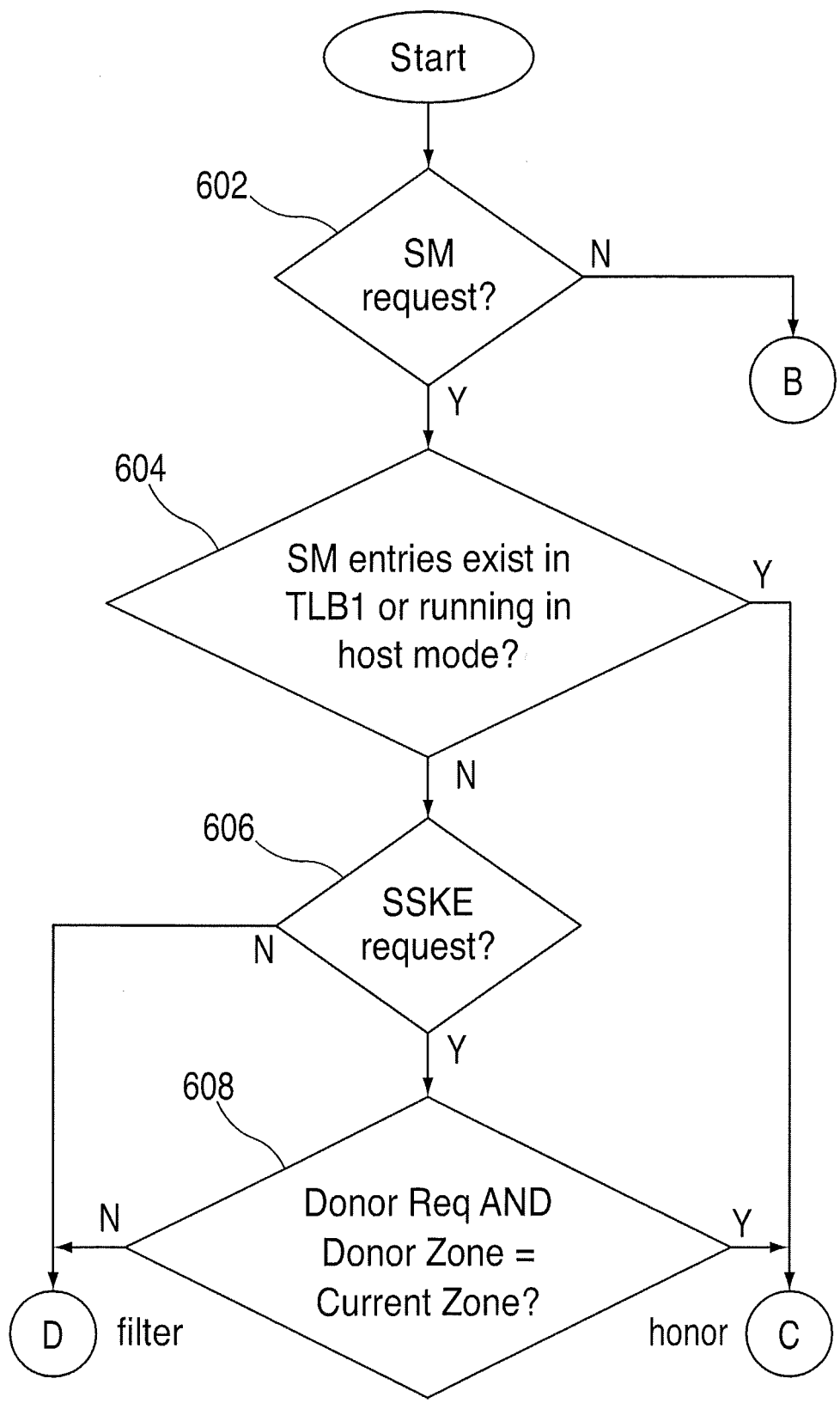
FIGS. 6A-6B depict one embodiment of an algorithm to filter incoming shared-memory quiesce interruption requests, in accordance with an aspect of the present invention.
Figure 6B:
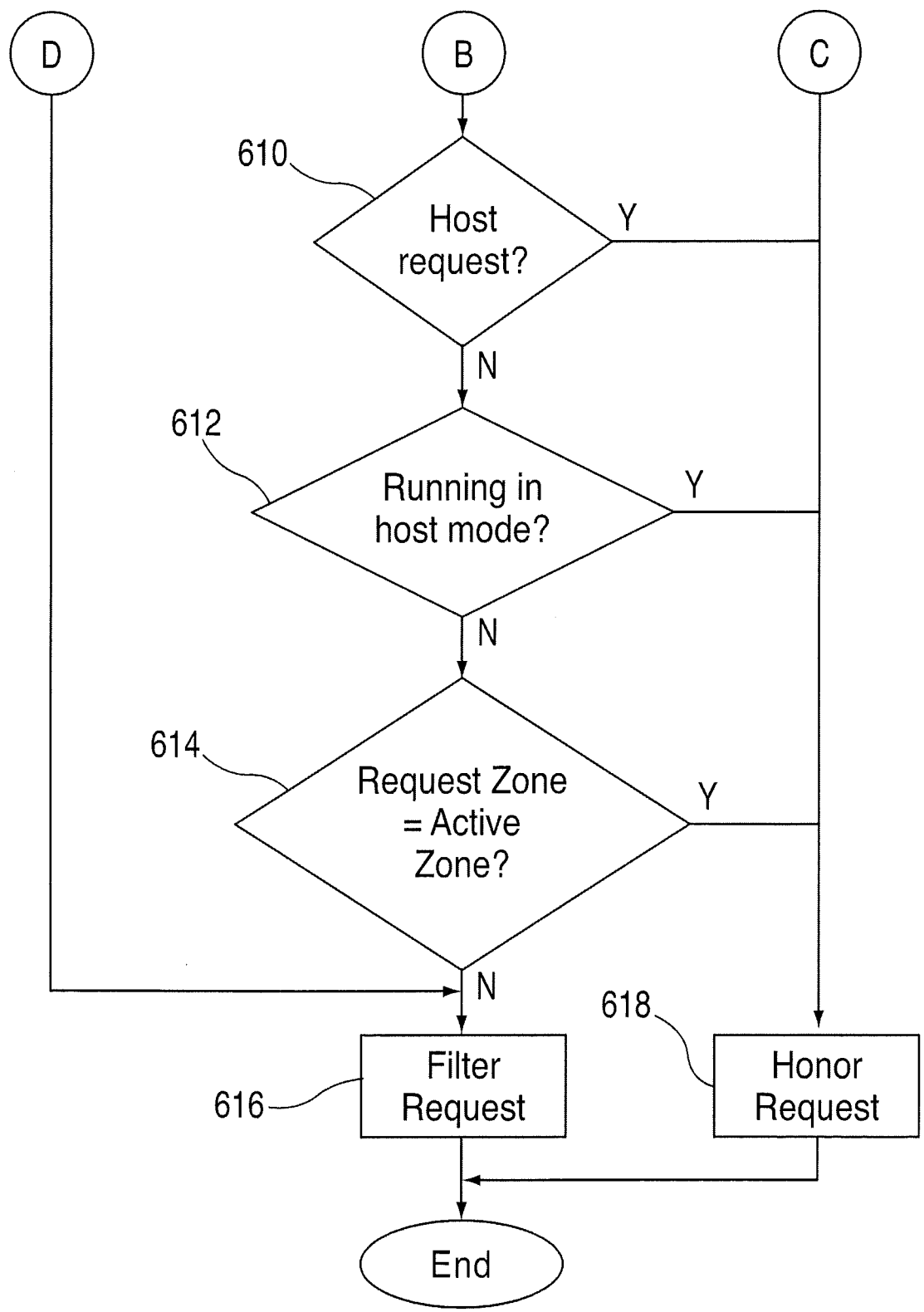

FIGS. 6A-6B depict the action required on each processor to determine if an incoming quiesce interruption request should be honored or filtered. Only two types of shared-memory requests are permitted. These are a shared-memory SSKE request and a shared-memory purge request. If the request is tagged as a shared-memory request (602), then if the latch is set indicating that shared-memory entries may exist in the TLB1 or the processor is currently running in host mode (604), then the quiesce interruption is honored (618). Otherwise, if no shared memory entries exist in the TLB1 (604) and if 1) the request is a shared-memory request but it is not initiated by an SSKE (606), i.e. it is a shared-memory purge, or 2) the shared-memory request was initiated by SSKE (606) but the donor zone does not equal the current zone or was a non-donor request (608) then the request is filtered (616). If no shared memory entries exist in the TLB1 (604) and the request was a shared-memory SSKE (606) and the donor zone matches the current zone (608) then the quiesce interruption request is honored (618).

Technical effects and benefits include the ability to prevent zones which are updating system resources in shared memory from adversely affecting the performance of partitions that are not using shared memory.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. The capabilities of the present invention can be implemented in software, firmware, hardware or some combination thereof. For example, embodiments of the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for filtering quiesce interruption requests, the method comprising:
   receiving a shared-memory quiesce request at a processor in a computing system, the computing system comprising a plurality of zones and a shared-memory accessible by the plurality of zones, the request specifying a donor zone, the donor zone comprising a zone, of the plurality of zones, which donated storage for use as the shared-memory, and the processor including a translation look aside buffer one (TLB1);
   determining whether there are any entries in the TLB1 corresponding to the shared-memory;
   determining whether the donor zone is equal to a current zone of the processor;
   determining whether the processor is currently running in host mode;
   filtering the shared-memory quiesce request based on determining that there are not any entries in the TLB1 corresponding to the shared-memory and that the donor zone is not equal to a current zone of the processor and that the processor is not currently running in host mode; and
   honoring the shared-memory quiesce request based on determining that there are entries in the TLB1 corresponding to the shared-memory.

2. The method of claim 1 wherein a latch on the processor is set to indicate that there may be entries in the TLB1 corresponding to the shared-memory and reset to indicate that there are not any entries in the TLB1 corresponding to the shared-memory.

3. The method of claim 2 wherein the latch is reset based on a purge of the TLB1.

4. The method of claim 2 wherein the latch is set based on a shared-memory translation being received by the TLB1.

5. The method of claim 1 wherein the shared-memory is a donor model shared-memory.

6. The method of claim 1 wherein the shared-memory quiesce request is a set storage key extended (SSKE) instruction.

7. The method of claim 1 wherein the shared-memory quiesce request is a purge command and the method further comprises filtering the shared-memory quiesce request based on determining that there are not any entries in the TLB1 corresponding to the shared-memory and that the processor is not currently running in host mode.

8. A system for filtering quiesce interruption requests, the system comprising:
   a shared-memory accessible by a plurality of zones in the system; and
   a processor comprising:
      a translation look aside buffer one (TLB1); and
      logic configured to perform a method, the method comprising:
         receiving a shared-memory quiesce request at the processor, the request specifying a donor zone, the donor zone comprising a zone, of the plurality of zones, which donated storage for use as the shared-memory;
         determining whether there are any entries in the TLB1 corresponding to the shared-memory;
         determining whether the donor zone is equal to a current zone of the processor;
         determining whether the processor is currently running in host mode;
         filtering the shared-memory quiesce request based on determining that there are not any entries in the TLB1 corresponding to the shared-memory and that the donor zone is not equal to a current zone of the processor and that the processor is not currently running in host mode; and
         honoring the shared-memory quiesce request based on determining that there are entries in the TLB1 corresponding to the shared-memory.

9. The system of claim 8 further comprising a latch on the processor that is set to indicate that there may be entries in the TLB1 corresponding to the shared-memory and reset to indicate that there are not any entries in the TLB1 corresponding to the shared-memory.

10. The system of claim 9 wherein the latch is reset based on a purge of the TLB1.

11. The system of claim 9 wherein the latch is set based on a shared-memory translation being received by the TLB1.

12. The system of claim 8 wherein the shared-memory is a donor model shared-memory.

13. The system of claim 8 wherein the shared-memory quiesce request is a set storage key extended (SSKE) instruction.

14. The system of claim 8 wherein the shared-memory quiesce request is a purge command and the method further comprises filtering the shared-memory quiesce request based on determining that there are not any entries in the TLB1 corresponding to the shared-memory and that the processor is not currently running in host mode.

15. A computer program product for filtering quiesce interruption requests, the computer program product comprising:
a tangible storage medium readable by a processing circuit and storing instructions for execution by the processing circuit for performing a method comprising:
receiving a shared-memory quiesce request at a processor in a computing system, the computing system comprising a plurality of zones and a shared-memory accessible by the plurality of zones, the request specifying a donor zone, the donor zone comprising a zone, of the plurality of zones, which donated storage for use as the shared-memory, and the processor including a translation look aside buffer one (TLB1);
determining whether there are any entries in the TLB1 corresponding to the shared-memory;
determining whether the donor zone is equal to a current zone of the processor;
determining whether the processor is currently running in host mode;
filtering the shared-memory quiesce request based on determining that there are not any entries in the TLB1 corresponding to the shared-memory and that the donor zone is not equal to a current zone of the processor and that the processor is not currently running in host mode; and
honoring the shared-memory quiesce request based on determining that there are entries in the TLB1 corresponding to the shared-memory.

16. The computer program product of claim 15 wherein a latch on the processor is set to indicate that there may be entries in the TLB1 corresponding to the shared-memory and reset to indicate that there are not any entries in the TLB1 corresponding to the shared-memory.

17. The computer program product of claim 16 wherein the latch is reset based on a purge of the TLB1.

18. The computer program product of claim 16 wherein the latch is set based on a shared-memory translation being received by the TLB1.

19. The computer program product of claim 15 wherein the shared-memory is a donor model shared-memory.

20. The computer program product of claim 15 wherein the shared-memory quiesce request is a set storage key extended (SSKE) instruction.

* * * * *